United States Patent [19]

Ozoe et al.

[11] Patent Number: 5,089,601
[45] Date of Patent: Feb. 18, 1992

[54] CHLOROPRENE POLYMER

[75] Inventors: Shinji Ozoe, Shinnanyo; Hiroshi Yamakawa, Kudamatsu, both of Japan

[73] Assignee: Tosoh Corporation, Shinnanyo, Japan

[21] Appl. No.: 578,535

[22] Filed: Sep. 7, 1990

[30] Foreign Application Priority Data

Sep. 7, 1989 [JP] Japan .................................. 1-230386
Jan. 18, 1990 [JP] Japan .................................... 2-7214
Apr. 5, 1990 [JP] Japan ................................... 2-89241

[51] Int. Cl.$^5$ ............................................. C08G 75/26
[52] U.S. Cl. ................................ 528/390; 204/157.77; 522/55; 522/180; 525/259; 526/85; 568/20
[58] Field of Search ................... 528/390; 522/180, 55; 525/259; 526/85; 568/20

[56] References Cited

U.S. PATENT DOCUMENTS

| | | | |
|---|---|---|---|
| 2,376,339 | 5/1945 | Browning | 528/390 |
| 3,047,544 | 7/1962 | Byrd | 528/390 |
| 3,317,451 | 5/1967 | Apotheker | 528/390 |
| 3,409,527 | 11/1968 | Lefevere | 522/180 |
| 3,580,830 | 5/1971 | Siebert | 526/85 |
| 3,838,140 | 9/1974 | Mayer-Mader | 528/390 |
| 3,900,379 | 8/1975 | Takeshita | 528/390 |
| 4,348,515 | 9/1982 | Morgan | 528/390 |

FOREIGN PATENT DOCUMENTS 0237792 3/1986 European Pat. Off. .

OTHER PUBLICATIONS

Polymer Bulletin, vol. 11, 1984, pp. 135–142, T. Otsu et al.: "Living Mono- and Biradical Polymerizations in Homogeneous System Synthesis of AB and ABA Type Block Copolymers", p. 1315: "Summary".

Primary Examiner—Joseph L. Schofer
Assistant Examiner—Fred Zitomer

Attorney, Agent, or Firm—Oblon, Spivak, McClelland, Maier & Neustadt

[57] ABSTRACT

A chloroprene polymer having dithiocarbamate groups at both terminals, represented by the following formula (I):

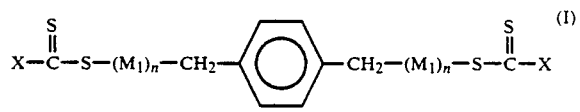

wherein $M_1$ is a chloroprene monomer residue; X is a group represented by the following formula (II):

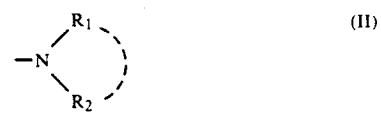

wherein $R_1$ is a $C_1$-$C_8$ alkyl group, $R_2$ is a $C_1$-$C_8$ alkyl group or a hydrogen atom, $R_1$ and $R_2$ may be the same or different, or $R_1$ and $R_2$ together form a $C_3$-$C_8$ methylene group so that they form a cyclic group together with the adjacent nitrogen atom, or a group represented by the following formula (III):

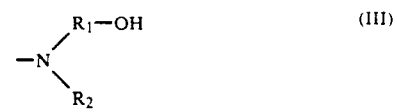

wherein $R_1$ is a $C_1$-$C_8$ alkyl group, and $R_2$ is a $C_1$-$C_8$ alkyl group or a hydrogen atom; and n is a natural number of from 10 to 5,000 when X is the group of the formula (II) or a natural number of form 5 to 100 when X is the group of the formula (III).

9 Claims, 6 Drawing Sheets

CHLOROPRENE POLYMER

The present invention relates to a novel polychloroprene. More particularly, it relates to a both-terminal dithiocarbamate-modified polychloroprene which is useful as a polymer photopolymerization initiator useful for the production of a block copolymer. Further, it relates to an ABA-type triblock copolymer obtainable by using such both-terminal dithiocarbamate-modified polychloroprene as an initiator and having polychloroprene in an intermediate block, which is useful as a material for e.g. packings, adhesives, soles of shoes, hoses, tubes or automobile parts. Furthermore, if a photopolymerization initiator having hydroxyl groups at both terminals is selected among the photopolymerization initiators to be used in the present invention, and chloroprene is polymerized by means of such an initiator, it is possible to obtain a polychloroprene having hydroxyl groups at both terminals. Such hydroxyl group-terminated polychloroprene can be cured by a polyfunctional compound such as a polyvalent isocyanate or a polyvalent acid chloride compound, and it is useful as a sticking agent, an adhesive, a sealant, a coating material or a resin modifier.

In recent years, in the mold processing of elastomers, an improvement in processability and energy saving has been strongly desired. Against such industrial demands, the current curing step for elastomers is of a large energy consumption type, and the processability can hardly be said to be satisfactory. Thus, the conventional curing step has many problems to be solved. Under these circumstances, a demand for thermoplastic elastomers of energy saving type where the compounding and the curing step can be simplified or omitted, is rapidly increasing. Further, for the same reasons, research relating to reactive liquid rubbers is being conducted actively.

As represented by styrene-butadiene-styrene (SBS), thermoplastic elastomers usually have a triblock structure or a multiblock structure. These elastomers are usually produced by a living anion polymerization method. Ionic polymerization of chloroprene has been studied, but the interaction between the chlorine atoms contained in the chloroprene monomer and the metal catalyst, is extremely strong, and there has been a problem such as deactivation of the catalyst due to withdrawal of the chlorine atoms (e.g. Vysokomol. Soyed. Vol. 6, No. 9, p 1637 (1964); Vysokomol. Soyed. Vol. 3, No. 5, p798 (1961); and Vysokomol. Soyed. Vol. 19, No. 12, p2793 (1977)). Accordingly, it is presently difficult to produce polychloroprene by ionic polymerization.

As a method for obtaining a block copolymer, a polymer reaction by means of a telechelic polymer having functional groups at the molecular terminals, has been reported (e.g. Japanese Unexamined Patent Publication No. 103605/1990). However, there has been no report concerning a telechelic polychloroprene.

On the other hand, with respect to liquid rubbers, a liquid rubber having a narrow molecular weight has already been prepared by subjecting butadiene to living anionic polymerization at a high rate of introduction of functional groups (Journal of Japan Rubber Association Vol. 48, No. 5, p263 (1975)).

On the other hand, for the above-mentioned reason, there has been no successful case for anionic polymerization of chloroprene, and it has been common to employ radical polymerization for the production of liquid polychloroprene. For example, a method of introducing functional groups to polymer terminals by subjecting chloroprene to radical polymerization by means of an azoinitiator having functional groups such as carboxyl groups or hydroxyl groups, has been reported (Journal of Polymer Science, Chemical Edition, No. 9, p2147 (1971); Journal of Polymer Science, Chemical Edition, No. 11, p55 (1973). Further, a method of introducing hydroxyl groups to polymer terminals by photopolymerizing chloroprene by means of a xanthogene disulfide compound having a hydroxyl group, is known (U.S. Pat. No. 3,900,379). However, liquid polychloroprene obtained by these methods contains a substantial amount of homopolymer of chloroprene and has a problem that variation in the number of functional groups per molecule is substantial.

The present invention has been made in view of the above-mentioned problems and provides a polychloroprene having dithiocarbamate groups at both terminals and an ABA-type triblock copolymer having polychloroprene in an intermediate block, which is obtainable by using such polychloroprene. Further, the present invention provides a reactive polychloroprene- having hydroxyl groups at both terminals.

Namely, the present invention provides a chloroprene polymer having dithiocarbamate groups at both terminals, represented by the following formula (I):

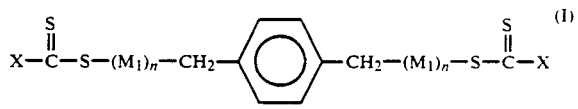

wherein $M_1$ is a chloroprene monomer residue; X is a group represented by the following formula (II):

wherein $R_1$ is a $C_1$-$C_8$ alkyl group, $R_2$ is a $C_1$-$C_8$ alkyl group or a hydrogen atom, $R_1$ and $R_2$ may be the same or different, or $R_1$ and $R_2$ together form a $C_3$-$C_8$ methylene group so that they form a cyclic group together with the adjacent nitrogen atom, or a group represented by the following formula (III):

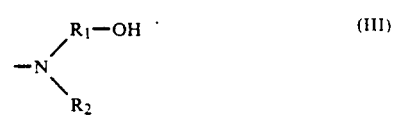

wherein $R_1$ is a $C_1$-$C_8$ alkyl group, and $R_2$ is a $C_1$-$C_8$ alkyl group or a hydrogen atom; and n is a natural number of from 10 to 5,000 when X is the group of the formula (II) or a natural number of from 5 to 100 when X is the group of the formula (III).

The present invention further provides a chloroprene block copolymer represented by the following formula (IV):

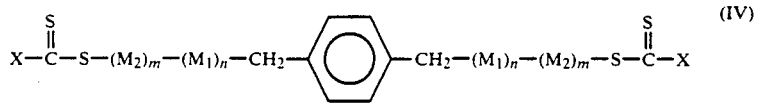

wherein $M_1$ is a chloroprene monomer residue; $M_2$ is a residue of a monomer selected from the group consisting of acrylic acid, an acrylate, methacrylic acid and a methacrylate, represented by the following formula (V):

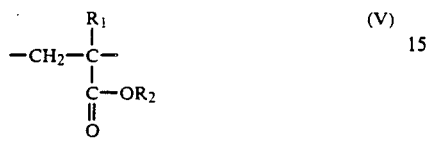

wherein $R_1$ is a hydrogen atom or a methyl group, and $R_2$ is a hydrogen atom, a $C_1$-$C_{18}$ alkyl group, an allyl group or an alkoxyl group, or an aromatic vinyl monomer residue represented by the following formula (VI):

wherein $R_1$ is a hydrogen atom or a methyl group, and $R_2$ is a phenyl group or an alkylphenyl group; X is a group represented by the following formula (VII):

wherein each of $R_3$ and $R_4$ is a $C_1$-$C_4$ alkyl group, and $R_3$ and $R_4$ may be the same or different; and each of n· and m is a natural number of from 20 to 5,000.

Now, the present invention will be described in detail with reference to the preferred embodiments.

Figure 1:
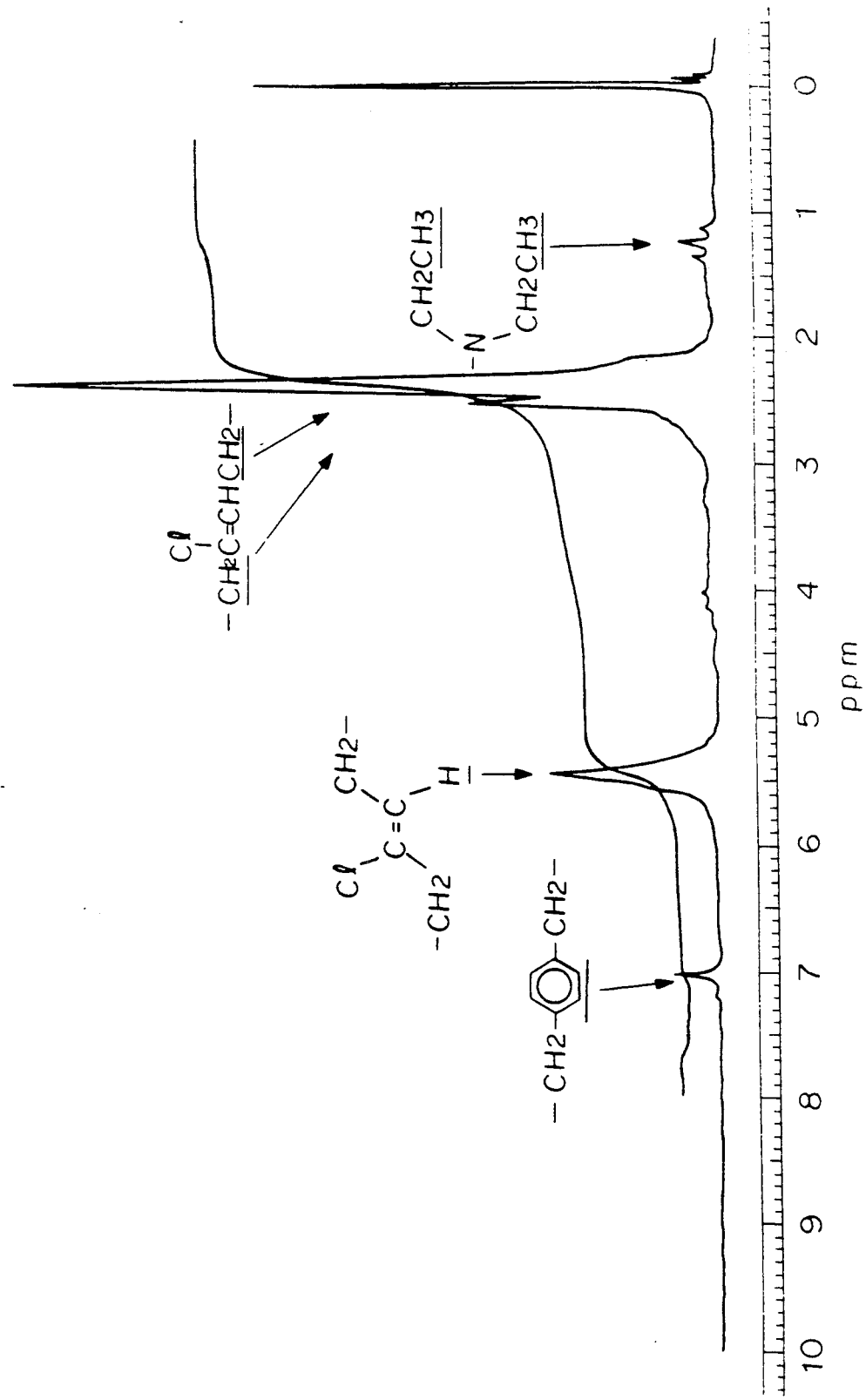
FIG. 1 is the proton nuclear magnetic resonance spectrum of the polymer obtained in Example 1 of the present invention.

Both-terminal dithiocarbamate-modified polychloroprenes of the above-formula (I) can be prepared by using as initiators so-called iniferter (Polymer Bulletin, No. 7, p 45 (1982)) represented by the following formula (VIII):

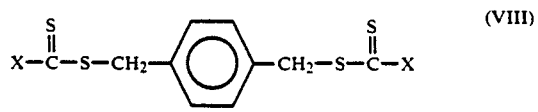

wherein X is a group represented by the following formula (II):

wherein $R_1$ is a $C_1$-$C_8$ alkyl group, $R_2$ is a $C_1$-$C_8$ alkyl group or a hydrogen atom, $R_1$ and $R_2$ may be the same or different, or $R_1$ and $R_2$ together form a $C_3$-$C_8$ methylene group so that they form a cyclic group together with the adjacent nitrogen atom, or a group represented by the following formula (III):

wherein $R_1$ is a $C_1$-$C_8$ alkyl group, and $R_2$ is a $C_1$-$C_8$ alkyl group or a hydrogen atom.

The initiator of the above formula (VIII) can efficiently be prepared from the corresponding dihalide, an amine, carbon disulfide and potassium hydroxide or sodium hydroxide. For example, p-xylylenebis(N-ethyl-N-(2-hydroxyethyl)dithiocarbamate) can be prepared from xylylene dichloride, 2-ethylaminoethanol, carbon disulfide and potassium hydroxide.

Dithiocarbamate compounds to be used in the present invention, include, for example, p-xylylenebis(N,N-dimethyldithiocarbamate, p-xylylenebis-N,N-diethyldithiocarbamate, p-xylylenebis-N,N-dipropyldithiocarbamate, p-xylylenebis-N,N-dibutyldithiocarbamate, p-xylylenebis-N,N-dipentyldithiocarbamate, p-xylylenebis-N,N-dihexyldithiocarbamate, p-xylylenebis-N,N-diheptyldithiocarbamate, p-xylylenebis-N,N-dioctyldithiocarbamate, p-xylylenebis-N-methyldithiocarbamate, p-xylylenebis-N-ethyldithiocarbamate, p-xylylenebis-N-propyldithiocarbamate, p-xylylenebis-N-butyldithiocarbamate, p-xylylenebis-N-pentyldithiocarbamate, p-xylylenebis-N-hexyldithiocarbamate, p-xylylenebis-N-heptyldithiocarbamate, p-xylylenebis-N-octyldithiocarbamate, p-xylylenebis-N-cyclotrimethylenedithiocarbamate, p-xylylenebis-N-cyclotetramethylenedithiocarbamate, p-xylylenebis-N-cyclopentamethylenedithiocarbamate, p-xylylenebis-N-cyclohexamethylenedithiocarbamate, p-xylylenebis-N-cycloheptamethylenedithiocarbamate, p-xylylenebis-N-cyclooctamethylenedithiocarbamate, p-xylylenebis(N-methyl-N-(2-hydroxyethyl)dithiocarbamate), p-xylylenebis(N-ethyl-N-(2-hydroxyethyl)dithiocarbamate), p-xylylenebis(N-propyl-N-(2-hydroxyethyl)dithiocarbamate), p-xylylenebis(N-t-butyl-N-(2-hydroxyethyl)dithiocarbamate) and p-xylylenebis(N-(2-hydroxylethyl)dithiocarbamate).

Likewise, the chloroprene block copolymer presented by the above formula (IV) can be prepared by the following two step reaction by means of an iniferter represented by the following formula (IX):

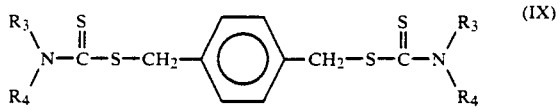

wherein each of $R_3$ and $R_4$ is a $C_1$–$C_4$ alkyl group, and $R_3$ and $R_4$ may be the same or different.

Firstly, chloroprene is subjected to photopolymerization by means of the initiator of the formula (IX) to obtain a both-terminal dithiocarbamate-modified polychloroprene represented by the formula (X):

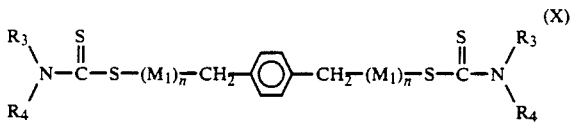

wherein $R_3$ and $R_4$ are as defined above, $M_1$ represents a chloroprene monomer residue, and n is a natural number of from 20 to 5,000.

Then, using this as an initiator, an acrylic acid, acrylate, methacrylic acid or methacrylate monomer or an aromatic vinyl monomer represented by $M_2$ in the above formula (IV) is photopolymerized to obtain a desired ABA-type triblock copolymer.

The methacrylate monomer to be used in the present invention, includes, for example, methyl methacrylate, ethyl methacrylate, n-butyl methacrylate, isobutyl methacrylate and mathacrylic acid. Likewise, the acrylate monomer includes, for example, methyl acrylate, ethyl acrylate, n-butyl acrylate, isobutyl acrylate, hexyl acrylate, isooctyl acrylate, 2-ethylhexyl acrylate, isononyl acrylate, decyl acrylate, stearyl acrylate, hydroxyethyl acrylate, 2-methoxyethyl acrylate, 2-ethoxyethyl acrylate, 2-butoxyethyl acrylate and acrylic acid. The aromatic vinyl monomer includes, for example, styrene, α-methyl styrene, β-methyl styrene, p-methylstyrene and m-methylstyrene.

For the photopolymerization reaction of chloroprene, it is preferred to employ ultraviolet rays having a wavelength necessary for the decomposition of the dithiocarbamate and the generation of radicals, for example, a wavelength of from 300 to 500 nm.

The polymerization reaction may be conducted in any state such as a bulk state, a solution state, a suspension state, a dispersion state, a slurry state or an emulsion state, so long as ultraviolet rays reach the initiator.

The solvent to be used for the solution polymerization is preferably one having a small chain transfer constant and showing no particular absorption of ultraviolet rays of from 300 to 500 nm. For example, it may be an aromatic hydrocarbon solvent such as benzene, toluene, xylene or ethylbenzene, or ethyl acetate. The polymerization is preferably conducted under an oxygen-removed state or in an inert atmosphere such as a nitrogen or argon atmosphere at a polymerization temperature of from 0° C. to 30° C.

According to the present invention, polychloroprenes having hydroxyl groups at both terminals and polychloroprenes having dithiocarbamate groups at both terminals can be obtained, which can be cured by a polyfunctional compound such as a polyvalent isocyanate or a polyvalent acid chloride compound and which are useful as polymer initiators useful for the production of block copolymers. Further, ABA-type block copolymers having chloroprene rubber in intermediate blocks, which are excellent in chemical stability and oil resistance, can be obtained by photopolymerizing various radical polymerizable monomers using said both terminal dithiocarbamate-modified polychloroprenes as photopolymerization initiators.

Now, the present invention will be described in further detail with reference to Examples. However, it should be understood that the present invention is by no means restricted by such specific Examples.

The analytical methods and conditions used for the identification and determination of the copolymers of the present invention are as follows.

(1) Proton nuclear magnetic resonance spectrum ($^1$H-NMR)
   Apparatus: Varian EM$_{360}$A NMR Spectrometer
(2) Infrared absorption spectrum (IR)
   Apparatus: Nippon Bunko IR-810 Model Infrared Spectrophotometer
(3) Vapor pressure osmometer
   Apparatus: KNAUER Vapor Pressure Osmometer
(4) Gel permeation chromatography (GPC)
   Apparatus: TOSOH HLC-802A
   Packed column: Styrene-divinylbenzene copolymer gel (TCG-gel G7000H6/G6000H6/G3000H8 type)
(5) Measurement of the sulfur content: Flask combustion method
   Absorbing solution: 3% hydrogen peroxide solution
   Titrant: 0.01N barium acetate solution
(6) Quantitative analysis of hydroxyl groups: acetylation method
   The sample was acetylated with acetic anhydride in the presence of pyridine, and water was added to convert excess acetic anhydride to acetic acid, which was titrated with an alkali.
(7) Transmission-type electron microscopic observation
   Apparatus: Nippon Denshi JEM-200FX
   Sample preparation method: From a benzene solution of the polymer, a cast film was prepared, and an ultra thin specimen was prepared by a microtome and stained by an osmium acid staining.

As the ultraviolet source, in Examples 1 to 3 and 6 to 9, a photochemical reaction apparatus (internally equipped with a 100 W mercury lamp UVL-100HA) manufactured by Ricoh Kagaku Sangyo K. K., was employed, and in Examples 4 and 5, UM$_{452}$ high pressure mercury lamp manufactured by Ushio Denki K. K., was employed.

EXAMPLE 1

Polymerization was conducted in the following manner. The monomer, the solvent and the initiator were sufficiently dried and deaerated in accordance with usual methods and then used for the polymerization. The reactor was thoroughly flushed with nitrogen, and then 2.40 g of p-xylylenebis-N,N-diethyldithiocarbamate (hereinafter referred to simply as XDC) of the following formula:

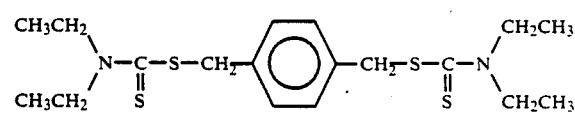

200 g of benzene and 51.3 g of chloroprene monomer were charged. Ultraviolet ray irradiation was conducted at 10° C. for about 20 hours under sufficient stirring in a nitrogen atmosphere. After completion of the polymerization, the reaction solution was poured into a large amount of methanol, purified by reprecipitation and dried under vacuum to obtain a chloroprene polymer at a yield of 74%. By liquid chromatography, it was confirmed that the formed polymer contained no unreacted XDC. Thus, XDC was believed to have completely added to the chloroprene polymer.

By the vapor pressure osmometer, the number average molecular weight of the formed polymer was measured and found to be 6,650. The sulfur content of the polymer was measured and found to be 1.9% by weight. Thus, the polymer was assumed to contain an average of 2.0 dithiocarbamate groups per molecule.

As a result of the $^1$H-NMR measurement of the formed polymer, the polymer was found to contain dithiocarbamate groups as shown in FIG. 1 and the molar ratio of the monomer residues was found to be chloroprene monomer residue/dithiocarbamate group = 34.9.

From the foregoing results, this polymer was concluded to be a polychloroprene having dithiocarbamate groups at both terminals.

EXAMPLE 2

2.08 g of p-xylylenebis-N-ethyldithiocarbamate (hereinafter referred to simply as XEC) of the following formula:

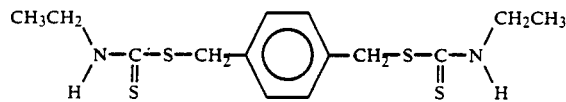

instead of 2.40 g of p-xylylenebis-N,N-diethyldithiocarbamate used in Example 1, 200 g of benzene and 60.5 g of chloroprene monomer were charged, and ultraviolet ray irradiation was conducted at 10° C. for about 20 hours under sufficient stirring in a nitrogen atmosphere. After completion of the polymerization, the reaction solution was poured into a large amount of methanol, purified by reprecipitation and dried under vacuum to obtain a chloroprene polymer at a yield of 62%. By liquid chromatography, it was confirmed that the formed polymer contained no unreacted XEC. Thus, XEC was believed to have completely added to the chloroprene polymer.

By the vapor pressure osmometer, the number average molecular weight of the formed polymer was measured and found to be 6,390. The sulfur content of the polymer was measured and found to be 2.0% by weight. Thus, this polymer was assumed to contain an average of 2.0 dithiocarbamate groups per molecule.

As a result of the $^1$H-NMR measurement of the formed polymer, the polymer was found to contain dithiocarbamate groups, and the molar ratio of the monomer residues was chloroprene monomer residue/dithiocarbamate group = 34.1.

From the foregoing results, this polymer was concluded to be a polychloroprene having dithiocarbamate groups at both terminals.

EXAMPLE 3

2.54 g of p-xylylenebis-N-cyclopentamethylenedithiocarbamate (hereinafter referred to simply as XCPC) of the following formula:

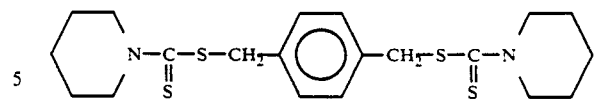

instead of 2.40 g of p-xylylenebis-N,N-diethyldithiocarbamate used in Example 1, 200 g of benzene and 65.5 g of chloroprene monomer were charged, and ultraviolet ray irradiation was conducted at 10° C. for about 20 hours under sufficient stirring in a nitrogen atmosphere. After completion of the polymerization, the reaction solution was poured into a large amount of methanol, purified by reprecipitation and dried under vacuum to obtain a chloroprene polymer at a yield of 67%. By liquid chromatography, it was confirmed that the formed polymer contained no unreacted XCPC. Thus, XCPC was believed to have completely added to the chloroprene polymer.

By the vapor pressure osmometer, the number average molecular weight of the formed polymer was measured and found to be 7,880. The sulfur content of the polymer was measured and found to be 1.6% by weight. Thus, this polymer was assumed to have an average of 2.0 dithiocarbamate groups per molecule.

As a result of the $^1$H-NMR measurement of the formed polymer, the polymer was found to contain dithiocarbamate groups, and the molar ratio of the monomer residues was found to be chloroprene monomer residue/dithiocarbamate group = 41.6.

From the foregoing results, this polymer was concluded to be a polychloroprene having dithiocarbamate groups at both terminals.

EXAMPLE 4

Into a 200 ml Pyrex glass eggplant-type flask, 4.3 g of p-xylylenebis(N-ethyl-N(2-hydroxyethyl)dithiocarbamate), 52.7 g of chloroprene monomer and 120 g of benzene were charged. After thoroughly flushing the interior with nitrogen, the flask was closed, and ultraviolet ray irradiation was conducted at 20° C. for 20 hours under stirring (the reactor was set at a distance of 10 cm from UM$_{452}$ high pressure mercury lamp manufactured by Ushio Denki K. K.). After completion of the reaction, the reaction solution was poured into a large amount of methanol, purified by reprecipitation and dried under vacuum to obtain 34.2 g of viscous polychloroprene.

Figure 2:
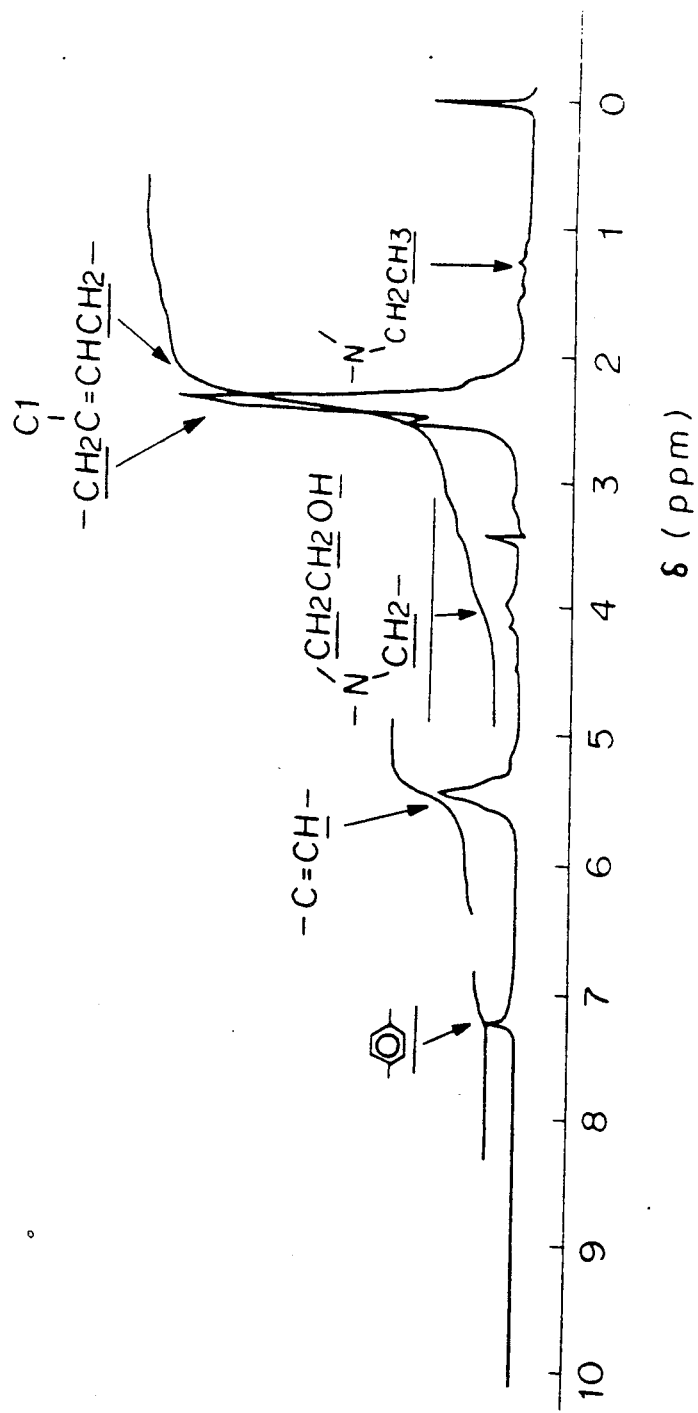
FIGS. 2 and 3 show the proton nuclear magnetic resonance spectrum and the infrared absorption spectrum of the polymer obtained in Example 4.

By the vapor pressure osmometer, the number average molecular weight of the formed polymer was measured and found to be 3,590. The sulfur content of the polymer was measured and found to be 3.58% by weight. Thus, this polymer was assumed to have an average of 2.0 dithiocarbamate groups per molecule. As a result of the $^1$H-NMR measurement of the formed polymer, the polymer was found to contain dithiocarbamate groups as fragments of the initiator, as shown in FIG. 2, and the molar ratio of the monomer residues was found to be chloroprene monomer residue/dithiocarbamate group = 35.02. From this value, the molecular weight of the polymer is calculated to be 3,530, which pretty well agrees with the value obtained by the vapor pressure osmometer.

Figure 3:
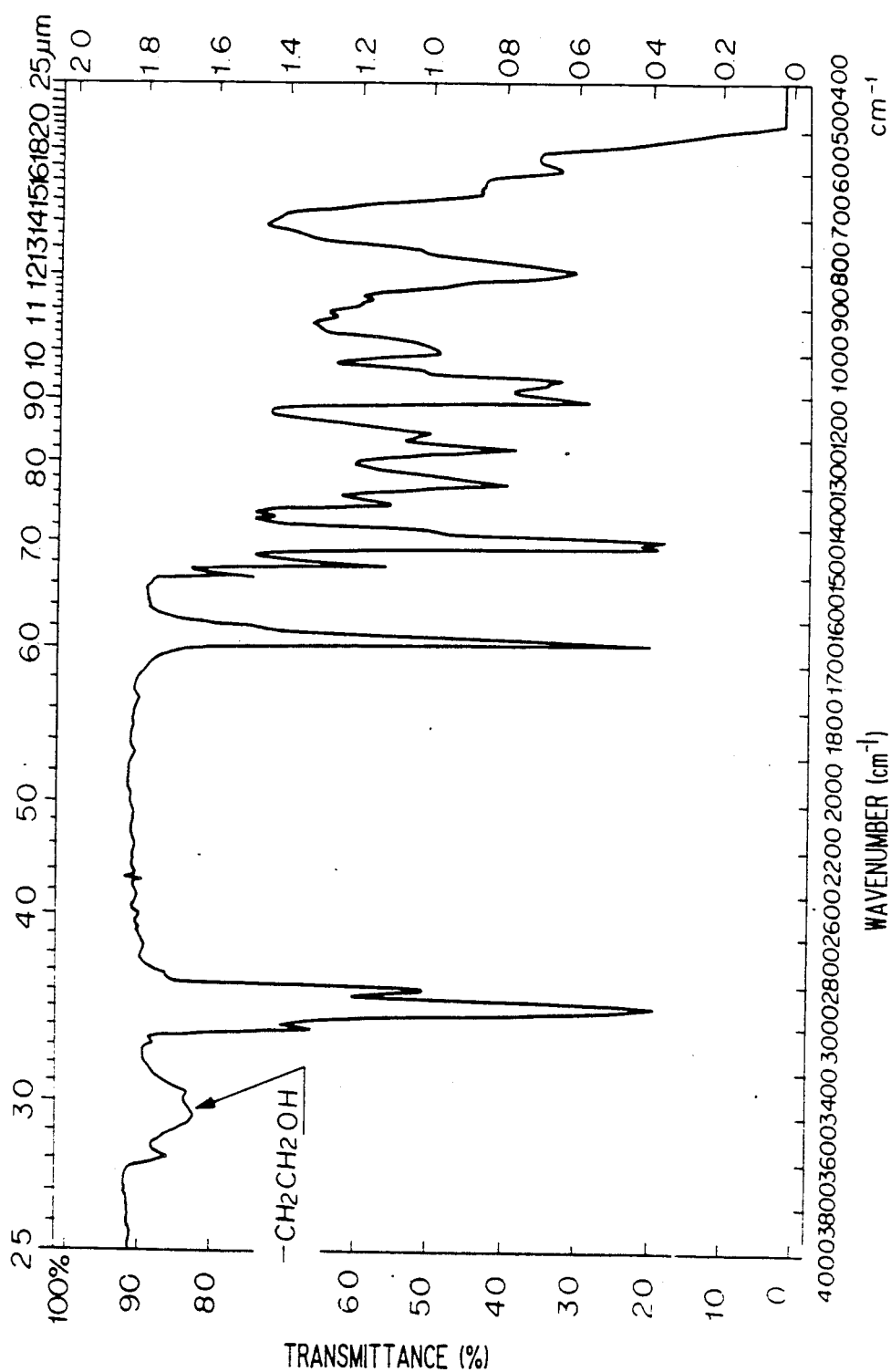

As a result of the IR measurement of the formed polymer, a peak attributable to a hydroxyl group was observed as shown in FIG. 3, and the hydroxyl group content was measured by an acetylation method and found to be 0.95% by weight. Thus, this polymer was assumed to have an average of 2.0 hydroxyl groups per molecule.

From the foregoing results, this polymer was concluded to be a polychloroprene having hydroxyl groups at both terminals.

EXAMPLE 5

4.3 g of p-xylylenebis(N-t-butyl-N-(2-hydroxyethyl)-dithicarbamate) instead of p-xylylenebis(N-ethyl-N-(2-hydroxyethyl)dithiocarbamate) used in Example 4, 45.8 g of chloroprene monomer and 115 g of benzene were charged. After thoroughly flushing the interior with nitrogen, the reactor was closed, and ultraviolet ray irradiation was conducted at 20° C. for 20 hours under stirring. After completion of the reaction, the reaction solution was poured into a large amount of methanol, purified by reprecipitation and dried under vacuum to obtain 26.1 g of viscous polychloroprene.

By the vapor pressure osmometer, the number average molecular weight of the formed polymer was measured and found to be 3,020. The sulfur content of the polymer was measured and found to be 4.23% by weight. Thus, this polymer was assumed to have an average of 2.0 dithiocarbamate groups per molecule.

As a result of the $^1$-NMR measurement of the formed polymer, the polymer was found to contain dithiocarbamate groups, and the molar ratio of the monomer residues was found to be chloroprene monomer residue/dithiocarbamate group = 28.27. From this value, the molecular weight of the polymer is calculated to be 2,990, which pretty well agrees with the value obtained by the vapor pressure osmometer.

The hydroxyl group content was measured by an acetylation method and found to be 1.12% by weight. Thus, this polymer was assumed to have an average of 2.0 hydroxyl groups per molecule.

From the foregoing results, this polymer was concluded to be a polychloroprene having hydroxyl groups at both terminals.

EXAMPLE 6

Using a photochemical reaction apparatus (internally equipped with a 100 W mercury lamp UVL-100HA) manufactured by Ricoh Kagaku Sangyo K. K., polymerization was conducted in the following manner. The monomer, the solvent and the initiator were thoroughly dried and deaerated in accordance with usual methods and then used for the polymerization.

After thoroughly flushing the reactor with nitrogen, 0.30 g of p-xylylenebis-N,N-diethyldithiocarbamate (hereinafter referred to simply as XDC) of the following formula:

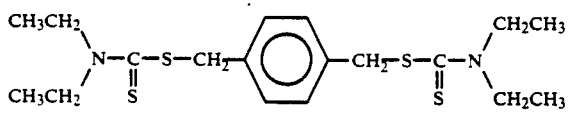

400 g of benzene and 82.5 g of chloroprene monomer were charged, and ultravoilet ray irradiation was conducted at 10° C. for about 20 hours under sufficient stirring in a nitrogen atmosphere. After completion of the polymerization, the reaction solution was poured into a large amount of methanol, purified by reprecipitation and dried under vacuum to obtain a chloroprene polymer at a yield of 83%.

The purified polymer was subjected to the molecular weight measurement by gel permeation chromatography, and as calculated as polystyrene, the number average molecular weight (Mn) was 97,000, and the weight average molecular weight (Mw) was 203,700.

Then, 8.3 g of this polymer and 400 g of benzene were introduced into the above reactor and the polymer was completely dissolved. Then, 4.3 g of styrene was added thereto and thoroughly mixed. Then, ultraviolet ray irradiation was conducted at 30° C. for 20 hours under stirring for polymerization.

After completion of the reaction, the content was subjected to reprecipitation from a large amount of methanol and dried under vacuum to obtain 10.7 g of a polymer. As calculated as a polystyrene, this polymer was found to have a number average molecular weight (Mn) of 128,000 and a weight average molecular weight (Mw) of 294,000.

Figure 4:
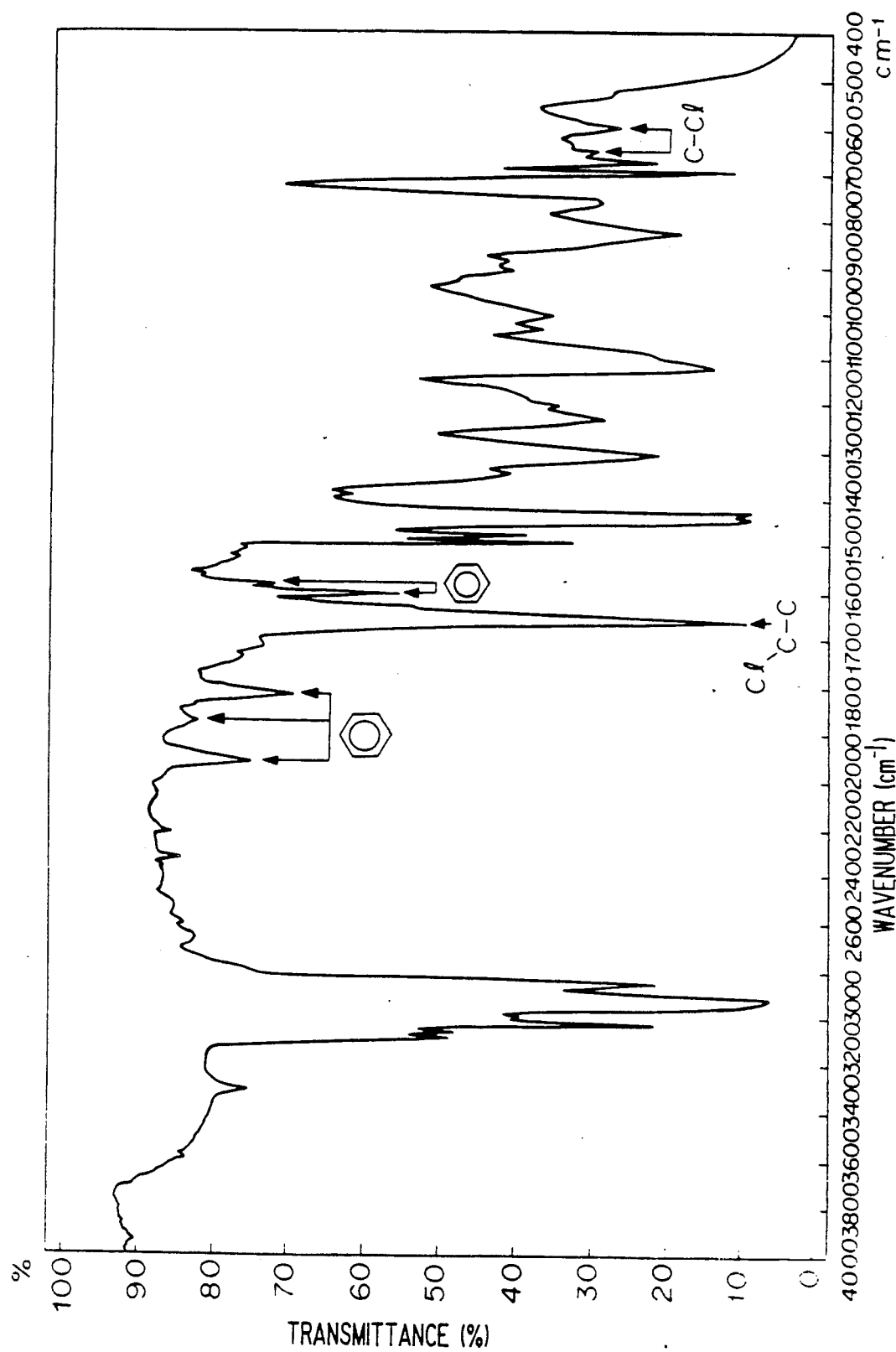
FIG. 4 is the infrared absorption spectrum of the polymer obtained in Example 6.

A benzene solution of the formed polymer was cast on a NaCl plate, and the IR measurement was conducted. The results are shown in FIG. 4. Absorption by polystyrene (1957, 1868, 1810, 1600, 1580 cm$^{-1}$) and absorption by polychloroprene (1659, 1630, 1300, 1119, 1090, 650, 600 cm$^{-1}$) were observed simultaneously. Thus, this polymer was found to be composed of chloroprene and styrene.

Further, to examine the phase separation structure of this polymer, transmission-type electron microscopic observation was conducted. As a result, a typical microphase-separated structure having spherical polystyrene domains with a diameter of from 300 to 500 Å dispersed in the matrix of polychloroprene, was observed. Such a structure can not be observed with a blend of polychloroprene and polystyrene.

Thus, it was concluded that the initiator was bifunctional and the polymer was an ABA type block copolymer comprising styrene polymer block A and chloroprene polymer block B.

EXAMPLE 7

A block copolymer was prepared under the same conditions as in Example 6 except that 4.3 g of α-methylstyrene was used instead of 4.3 g of styrene used in Example 6. The formed polymer was purified by reprecipitation by means of methanol and dried under vacuum to obtain 10.5 g of a polymer. The molecular weight of this polymer was found to be Mn = 118,000 and Mw = 254,000 as calculated as polystyrene.

By the transmission-type electron microscopic observation, a microphase-separated structure having spherical α-methylstyrene polymer domains with a diameter of from 300 to 500 Å dispersed in the matrix of polychloroprene, was observed. Thus, it was concluded that the initiator was bifunctional, and this polymer was an ABA type block copolymer composed of α-methylstyrene polymer block A and polychloroprene block B, from the change of the molecular weight and the microphase-separated structure of the polymer.

EXAMPLE 8

Using a photochemical reaction apparatus (internally equipped with a 100 W mercury lamp UVL-100HA) manufactured by Ricoh Kagaku Sangyo K. K., polymerization was conducted in the following manner. The monomer, the solvent and the initiator were thoroughly dried and deaerated in accordance with usual methods and then used for the polymerization.

After thoroughly flushing the reactor with nitrogen, 0.6 g of p-xylylenebis-N,N-diethyldithiocarbamate (hereinafter referred to simply as XDC) represented by the following formula:

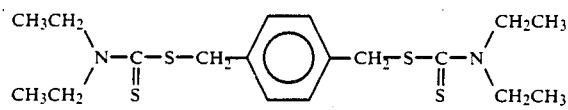

200 g of benzene and 56 g of chloroprene monomer were charged, and ultraviolet ray irradiation was conducted at 10° C. for about 20 hours under sufficient stirring in a nitrogen atmosphere.

After completion of the polymerization, the reaction solution was purified by reprecipitation by means of a large amount of methanol and dried under vacuum to obtain a chloroprene polymer at a yield of 74%. By liquid chromatography, it was confirmed that the formed polymer contained no unreacted XDC. Thus, XDC was believed to have completely added to the chloroprene polymer. The purified polymer was subjected to the molecular weight measurement by means of gel permeation chromatography, whereby as calculated as polystyrene, the number average molecular weight (Mn) was 70,000 and the weight average molecular weight (Mw) was 192,000.

Then, 6.75 g of this polymer and 100 g of benzene was introduced into the above reactor, and the polymer was completely dissolved. Then, 16.20 g of methyl methacrylate was added thereto, and the mixture was thoroughly mixed. Then, polymerization was conducted by irradiating ultraviolet rays at 30° C. for 20 hours under stirring.

Figure 5:
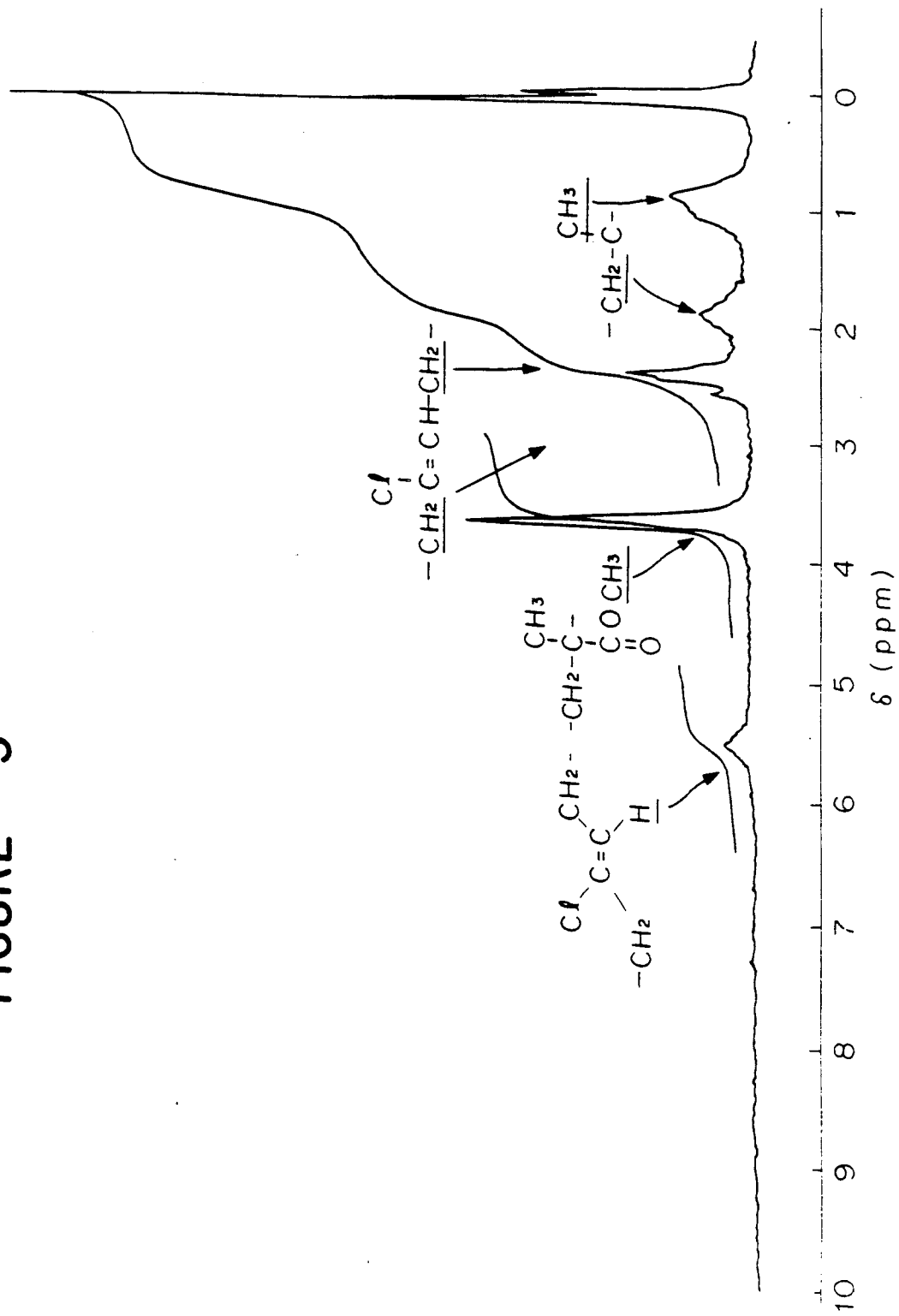
FIGS. 5 and 6 show the proton magnetic resonance spectrum and the infrared absorption spectrum of the polymer (a) obtained in Example 8.
Figure 6:
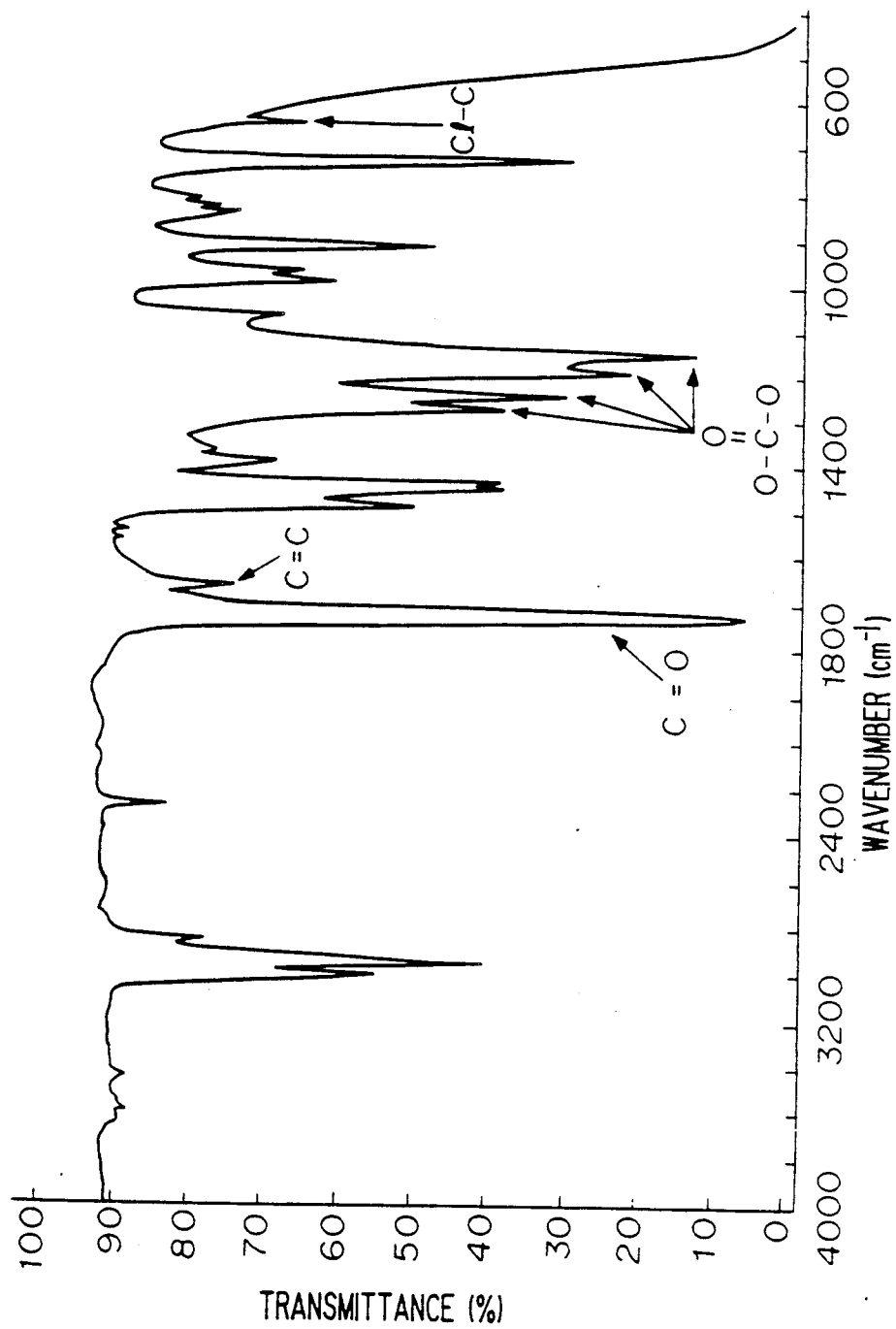

After completion of the reaction, the content was poured into a large amount of methanol and precipitated to obtain 18.01 g of a polymer. The formed polymer was all soluble in acetone. Further, by gradually adding methanol to an acetone solution of the formed polymer, separation precipitation was conducted. Precipitation of the polymer started when 1.2 times (by volume ratio) of methanol was added to acetone, whereupon the precipitate (a) and the dissolved product (b) were separated. The amounts were 16.85 g and 0.97 g, respectively. With respect to the separated products (a) and (b), the IR and $^1$H-NMR measurements were conducted. As shown in FIGS. 5 and 6, the polymer (a) contained both chloroprene and methyl methacrylate, and the molar ratio of the monomer residues was found to be chloroprene/methyl methacrylate =0.625. On the other hand, the polymer (b) was a homopolymer of methyl methacrylate.

The molecular weights of the formed polymers were as follows:

Polymer (a)

Mn =197,000
Mw =416,000

Polymer (b)

Mn =65,000
Mw =110,000

Thus, it was concluded that the initiator was bifunctional and the polymer (a) was an ABA type block copolymer composed of methyl methacrylate polymer block A and chloroprene polymer block B from the above results.

EXAMPLE 9

A block copolymer was prepared under the same conditions as in Example 8 except that methyl acrylate was used instead of 16.20 g of methyl methacrylate used in Example 8. The formed polymer was purified by separation precipitation by means of a solvent mixture of acetone/methanol and dried under vacuum. As a result, 1.10 g of a methyl acrylate homopolymer and 19.10 g of a polymer having a molar ratio of the constituting monomer residues of chloroprene/methyl acrylate =0.526, were obtained. The molecular weight of the latter copolymer was found to be Mn =200,000 and Mw =453,000. It was concluded that the initiator used was bifunctional and this polymer was an ABA type block copolymer composed of methyl acrylate polymer block A and polychloroprene block B.

I claim:

1. A chloroprene polymer having dithiocarbamate groups at both terminals, represented by the following formula (I):

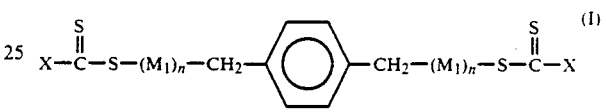

wherein $M_1$ is a chloroprene monomer residue; X is a group represented by the following formula (II):

wherein $R_1$ is a $C_1-C_8$ alkyl group, $R_2$ is a $C_1-C_8$ alkyl group or a hydrogen atom, $R_1$ and $R_2$ may be the same or different, or $R_1$ and $R_2$ together form a $C_3-C_8$ methylene group so that they form a cyclic group together with the adjacent nitrogen atom, or a group represented by the following formula (III):

wherein $R_1$ is a $C_1-C_8$ alkyl group, and $R_2$ is a $C_1-C_8$ alkyl group or a hydrogen atom; and n is a natural number of from 10 to 5,000 when X is the group of the formula (II) or a natural number of from 5 to 100 when X is the group of the formula (III).

2. The polymer according to claim 1, wherein X is

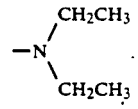

3. The polymer according to claim 1, wherein X is

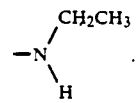

4. The polymer according to claim 1, wherein X is

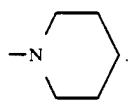

5. The polymer according to claim 1, wherein X is

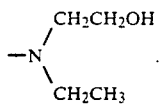

6. The polymer according to claim 1, wherein X is

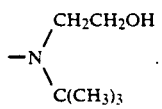

7. A chloroprene block copolymer represented by the following formula (IV):

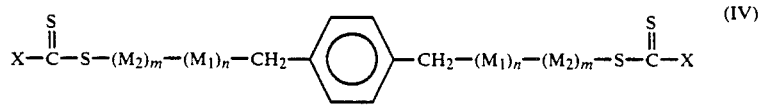

wherein $M_1$ is a chloroprene monomer residue; $M_2$ is a residue of a monomer selected from the group consisting of acrylic acid, an acrylate, methacrylic acid and a methacrylate, represented by the following formula (V):

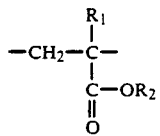

wherein $R_1$ is a hydrogen atom or a methyl group, and $R_2$ is a hydrogen atom, a $C_1$-$C_{18}$ alkyl group, an allyl group or an alkoxyl group, or an aromatic vinyl monomer residue represented by the following formula (VI):

wherein $R_1$ is a hydrogen atom or a methyl group, and $R_2$ is a phenyl group or an alkylphenyl group X is a group represented by the following formula (VII):

$$-N\begin{matrix}R_3\\ \\R_4\end{matrix} \quad (VII)$$

wherein each of $R_3$ and $R_4$ is a $C_1$-$C_4$ alkyl group, and $R_3$ and $R_4$ may be the same or different; add each of n and m is a natural number of from 20 to 5,000.

8. The block copolymer according to claim 7, wherein M is the residue of the formula (V) wherein $R_1$ is a hydrogen atom or a methyl group, and $R_2$ is a methyl group; and X is

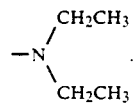

9. The block copolymer according to claim 7, wherein M is the residue of the formula (VI) wherein $R_1$ is a hydrogen atom or a methyl group, and $R_2$ is a phenyl group; and X is

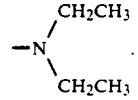

* * * * *